WINDSHIELD WIPER ARMS AND LOCKING DEVICES THEREFOR

Filed Sept. 29, 1959 2 Sheets-Sheet 1

INVENTOR.
ELMER E. REESE
BY
W. E. Finken
HIS ATTORNEY

Aug. 7, 1962 E. E. REESE 3,048,430
WINDSHIELD WIPER ARMS AND LOCKING DEVICES THEREFOR
Filed Sept. 29, 1959 2 Sheets-Sheet 2
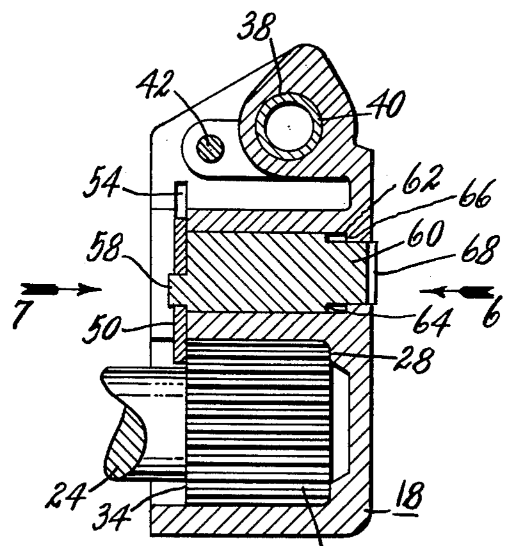
Fig. 5
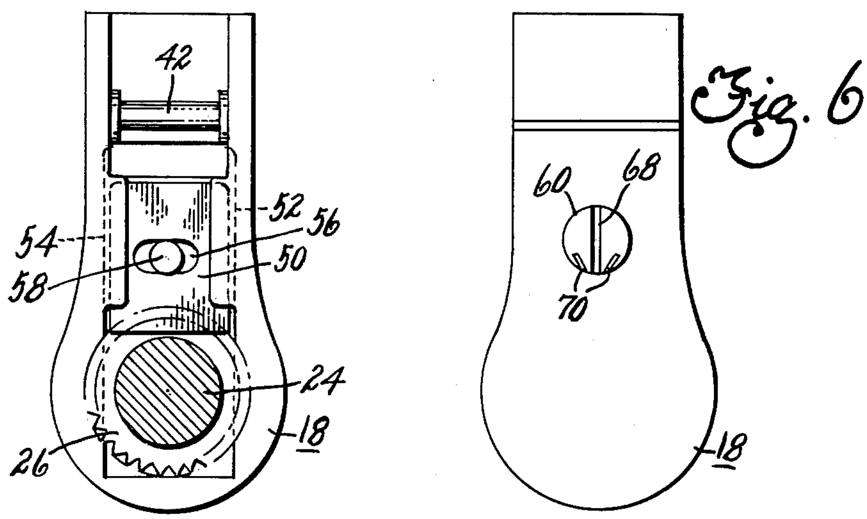
Fig. 7
Fig. 6
INVENTOR.
ELMER E. REESE
BY
W. E. Finken
HIS ATTORNEY United States Patent Office 3,048,430

Patented Aug. 7, 1962

3,048,430

WINDSHIELD WIPER ARMS AND LOCKING DEVICES THEREFOR

Elmer E. Reese, Rochester, N.Y., assignor to General Motors Corporation, Detroit, Mich., a corporation of Delaware Filed Sept. 29, 1959, Ser. No. 843,157
1 Claim. (Cl. 287—53)

The present invention pertains to the art of windshield cleaning, and particularly to windshield wiper arms and locking devices for securing wiper arms to actuating shafts.

The majority of motor vehicles are equipped with dual windshield cleaners, comprising arms and blades, the arms being drivingly connected to actuating shafts through mating serrated parts. Heretofore, numerous types of locking devices have been proposed for retaining the arms in assembled relation with respect to their actuating shafts, but the majority of these devices are not manually releasable from the exterior of the wiper arm. The present invention relates to locking devices which are externally releasable so as to permit ready assembly and disassembly of the arms and shafts. Accordingly, among my objects are the provision of readily releasable locking means for attaching a wiper arm to its actuating shaft; the further provision of locking means of the aforesaid type including a reciprocable button; and the still further provision of locking means of the aforesaid type including a rotatable eccentric and means for indicating whether the locking means is released or engaged.

The aforementioned and other objects are accomplished in the present invention by utilizing leaf spring means which are engageable with the shoulder on the drive spindle, or burr, for preventing relative axial movement between the wiper arm and the actuating shaft in combination with external means for releasing the leaf spring lock. Specifically, two embodiments of improved locking devices are disclosed herein. Both embodiments are designed for use with a wiper arm having an inner section with an axially serrated socket recess adapted for driving engagement with a serrated burr, or spindle, on the actuating shaft. As is customary, the burr is of greater diameter than the actuating shaft and thus forms a shoulder which can be engaged by locking means disposed on the underneath side of the inner arm section.

In the first embodiment the locking means comprises a leaf spring, one end of which is riveted to the die cast inner arm section, the other end of the leaf spring extending into the socket recess so as to be engageable with the shoulder on the drive burr. In this embodiment the inner arm section is formed with an opening spaced from but parallel to the socket recess for receiving a headed pin, or button. The inner end of the button engages the leaf spring and the outer end protrudes from the top of the inner arm section. The leaf spring normally maintains the button in the projected position at which time the locking means are engaged. To release the locking means, it is only necessary to depress the button thereby disengaging the free end of the leaf spring from the shoulder on the drive burr.

In the second embodiment the locking means comprises a leaf spring supported for sliding movement along the longitudinal axis of the wiper arm, one end of the spring being adapted to extend into the socket recess so as to engage the shoulder on the drive burr. The leaf spring is formed with a transversely elongated slot that receives an eccentric pin carried by a rotatable member supported in a bore, the axis of which is spaced from and parallel to the axis of the socket recess. The rotatable member has a screw driver slot at its upper end and indicia thereon, which may be in the form of an arrow, for indicating whether the locking spring is released or engaged. By rotating the lock releasing and engaging member, the leaf spring lock is moved along the longitudinal axis of the arm into and out of engagement with the shoulder on the drive burr.

Further objects and advantages of the present invention will be apparent from the following description, reference being had to the accompanying drawing, wherein preferred embodiments of the present invention are clearly shown.

Figure 2:
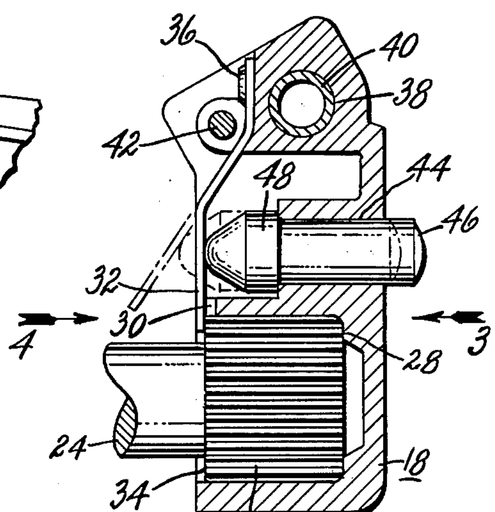
FIGURE 2 is an enlarged, sectional view of the inner arm section having the locking means of one embodiment of this invention.
Figure 4:
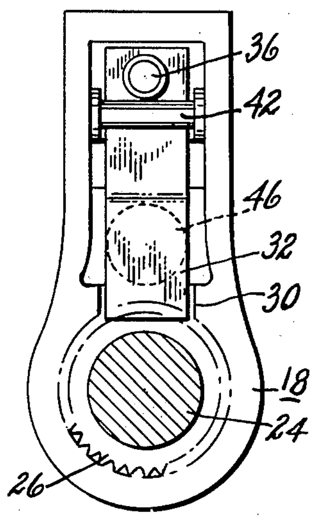
Figure 3:
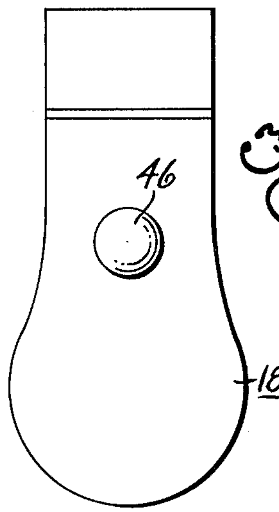

FIGURES 3 and 4 are plan views, respectively, taken in the direction of arrows 3 and 4 of FIGURE 2.

FIGURE 5 is an enlarged, sectional view similar to FIGURE 2 of the locking means constructed according to the second embodiment.

FIGURES 6 and 7 are plan views, respectively taken in the direction of arrows 6 and 7 of FIGURE 5.

Figure 1:
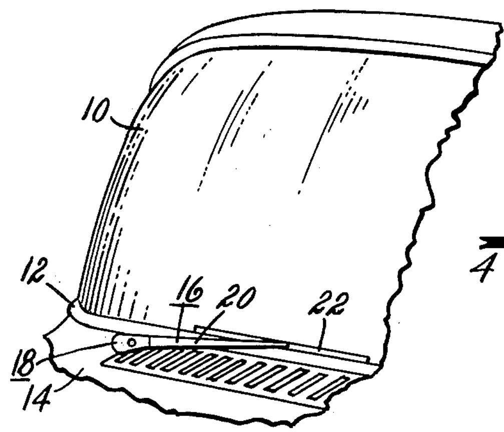
FIGURE 1 is a fragmentary view in elevation, of a portion of a vehicle including a windshield cleaner having the arm locking means of this invention.

With particular reference to FIGURE 1, a portion of a vehicle is shown having a windshield 10 with a lower reveal molding 12 and a cowl 14. The vehicle is equipped with a windshield cleaner comprising a wiper arm 16 having spring hinge connected inner and outer sections 18 and 20, the outer section of which carries a wiper blade 22. The inner arm section 18 is attached to a wiper shaft, not shown in FIGURE 1, for oscillating the wiper arm 16 and the wiper blade 22 across the outer surface of the windshield 10. In accordance with conventional practice, the wiper blade 22 is parked against the lower reveal molding 12 when the wiper mechanism is inactivated.

With reference to FIGURES 2 through 4, the first embodiment of the improved locking means for the wiper arm to shaft connection will be described. As seen in FIGURE 2, the wiper, or pivot, shaft 24 has an axially serrated burr, or spindle, 26 attached to one end thereof, the spindle being of greater diameter than the shaft 24. The inner arm section 18 which comprises a die casting, is formed with an axially serrated socket recess 28 adapted to drivingly engage the burr 26. A portion of the inner wall of the socket recess is cut away as indicated by numeral 30 for receiving the free end of a leaf spring 32 constituting the locking means. The free end of the leaf spring as shown in FIGURE 2 is engageable with a shoulder 34 constituted by the inner end of the spindle 26 for preventing relative axial movement between the wiper arm and the shaft 24.

The outer end of the leaf spring 32 is suitably attached to the die cast inner arm section 18 such as by an upset indicated by numeral 36. The inner arm section is formed with a transverse opening 38 having a bushing 40 for receiving a pin, not shown, by which the outer arm section 20 is pivotally connected to the inner arm section. In addition, the spaced webs of the inner arm section are interconnected by a second pin 42 constituting means for attaching one end of a tension spring, not shown. The inner arm section is also formed with an opening 44, the axis of which is parallel to and spaced from the axis of the socket recess 28. A pin, or button, 46 is slidably mounted within the opening 44, the button having an enlarged end 48 constituting a shoulder preventing separation of the button from the inner arm section. The end of the pin 46 engages the leaf spring 32, the leaf spring normally maintaining the parts in the relationship shown in FIGURE 2.

As seen particularly in FIGURES 2 and 4, the free end of the leaf spring extends into the socket recess 28 so as to be engageable with the shoulder 34 on the drive burr. In order to release the locking means, the button 46 is depressed thereby moving the free end of the leaf spring to the dotted line position shown in FIGURE 2. When the leaf spring locking means 32 is released, the arm can be withdrawn from the burr 26.

With particular reference to FIGURES 5 through 7, the second embodiment of the locking means will be described, similar numerals denoting similar parts throughout the several views. In the second embodiment, the inner arm section 18 is likewise formed with an axially serrated socket recess 28 for receiving an axially serrated drive burr, or spindle, 26 attached to the wiper shaft 24. The locking means in the second embodiment comprises a leaf spring 50 which is slidably mounted for movement along the longitudinal axis of the arm. To facilitate this movement, the marginal edges of the leaf spring 50 are supported in grooves 52 and 54 formed in the spaced webs of the inner arm section. The leaf spring 50 is formed with a transversely extending elongated slot 56 which receives a pin 58 eccentrically mounted on a rotatable member 60. The rotatable member 60 is disposed in a bore 62, the axis of which is parallel to and spaced from the axis of the socket recess 28.

In order to prevent separation of the rotatable member 60 from the bore 62, the rotatable member 60 is formed with an external shoulder 64 and the bore 62 is formed with an internal shoulder 66. The outer end of the rotatable member 60 is formed with a screw driver slot indicated by numeral 68, in FIGURE 6, and arrow-type indicia indicated by numeral 70. When the arrow type indicia 70 point towards the shaft 24, the end of the leaf spring lock 50 extends into the socket recess so as to prevent relative axial movement between the wiper arm and the shaft 24. In order to release the locking, the rotatable member 60 is turned 180° whereby the arrow points away from the pivot shaft 24 at which time the inner end of the leaf spring 50 is moved out of the socket recess.

From the foregoing it is readily apparent that the present invention provides externally releasable locking means for attaching a wiper arm to a wiper shaft, the wiper arm having a socket recess adapted to receive an enlarged drive spindle.

While the embodiments of the invention as herein disclosed constitute preferred forms, it is to be understood that other forms might be adopted.

What is claimed is as follows:

A windshield wiper arm including, an inner section having a socket recess, leaf spring locking means movably carried by said inner arm section and extendible into the socket recess, said leaf spring locking means being rigidly attached to said inner arm section, and wiper arm carried external means accessible from the top of said inner section and engageable with said locking means for retracting said locking means from said socket recess, said external means comprising a reciprocable button supported for movement in an opening parallel to and spaced from the socket recess and being held in assembled relation with said wiper arm by said leaf spring locking means.

References Cited in the file of this patent

UNITED STATES PATENTS

| | | |
|---|---|---|
| 255,847 | Fiske | Apr. 4, 1882 |
| 1,939,503 | King | Dec. 12, 1933 |
| 2,107,581 | Parsons et al. | Feb. 19, 1938 |
| 2,417,991 | Nesson | Mar. 25, 1947 |
| 2,564,819 | Shieberl | Aug. 21, 1951 |
| 2,668,726 | Stewart et al. | Feb. 9, 1954 |
| 2,723,139 | Whiteley | Nov. 8, 1955 |